Feb. 21, 1967 G. RAYNOVICH, JR 3,304,829
BLIND FASTENERS
Filed April 27, 1964 2 Sheets-Sheet 1

INVENTOR
George Raynovich, Jr.

Feb. 21, 1967    G. RAYNOVICH, JR    3,304,829
BLIND FASTENERS
Filed April 27, 1964    2 Sheets-Sheet 2

INVENTOR
George Raynovich, Jr.

United States Patent Office 3,304,829
Patented Feb. 21, 1967

3,304,829
BLIND FASTENERS
George Raynovich, Jr., Pittsburgh, Pa., assignor to
Edward M. Citron, Pittsburgh, Pa.
Filed Apr. 27, 1964, Ser. No. 362,580
5 Claims. (Cl. 85—70)

This invention relates to blind fasteners and particularly to a blind fastener which may be used on bolts to attach the same to the interior of a hole particularly in material incapable of being threaded.

The use of blind fasteners or expansion bolts for attaching objects to masonry walls and the like is not new. Nuts provided with spring loaded wings, with driven deformable metal portions and various deforming devices are known. Generally, however, these devices require excessively large holes as in the case of spring loaded wings or special tools as in the case of driven deformable metal portions on the nuts or for some other reason do not entirely satisfactorily act to attach objects to unthreaded holes.

I have invented a blind fastener or expansion bolt which requires a small hole and which completely fills and seals the hole when applied therein. My device is simple to install and requires no special tools.

In a preferred embodiment of my invention, I provide an elongated member having superimposed right and left hand threads, a pair of right hand threaded half nuts and a pair of left hand threaded half nuts, one of each pair attached to opposite ends of and spaced apart by a resilient member, said half nuts being adapted to interfit on said threaded member to form spaced right and left hand nuts and means for holding said half nuts in position on said threaded member. Preferably, the nuts are circular in peripheral contour and are imbedded at the ends of and surrounded by a resilient spacing means in the form of a half cylinder. The half nuts, one right hand and one left hand, may also be simply bonded to opposite ends of an elongated rubber half cylinder.

In the foregoing general description, I have set out certain objects, purposes and advantages of my invention. Other objects, purposes and advantages of this invention will be apparent from a consideration of the following description and the accompanying drawings in which FIGURE 1 is a side elevational view of a blind fastener according to my invention installed in a hole;

Figure 1:
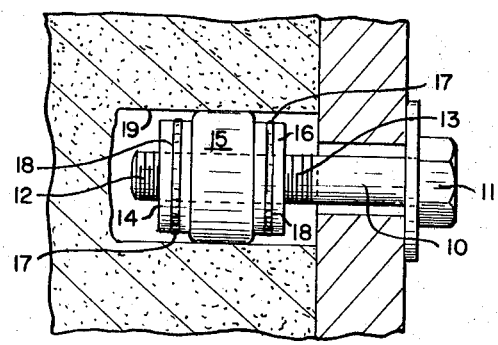

Referring to the drawings, I have illustrated a bolt 10 having a head 11 at one end and superimposed right hand threads 12 and left hand threads 13 at the opposite end. An expansible nut structure made up of right hand thread half nuts 14 bonded to one end of a half sleeve of rubber 15 and left hand half nuts 16 bonded to the other end of half sleeve 15. The half sleeve 15 may be of rubber, lead or any other readily deformable material. The half nut assemblies are placed on the threaded portions of bolt 10 and held together by a spring clip 17 resting in grooves 18 in each half nut.

The device of the invention is installed by placing the half nuts on the threaded portion of the bolt and inserting into the hole 19 into which attachment is to be made with a slight interference fit. The head 11 is engaged by a wrench and the bolt is turned. Since the nuts 12 and 13 are bonded to sleeves 15, they are prevented from turning by the interference fit of the sleeves with the hole 19, thereby causing the nuts to move toward each other compressing the rubber or other deformable half sleeve 15 as illustrated in FIGURE 1 into tight engagement with the internal periphery of the hole.

Figure 2:
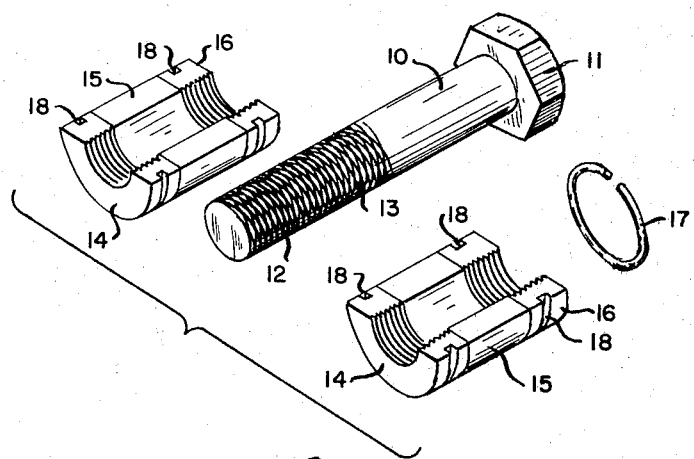
FIGURE 2 is an isometric exploded view of the fastener of FIGURE 1.
Figure 3:
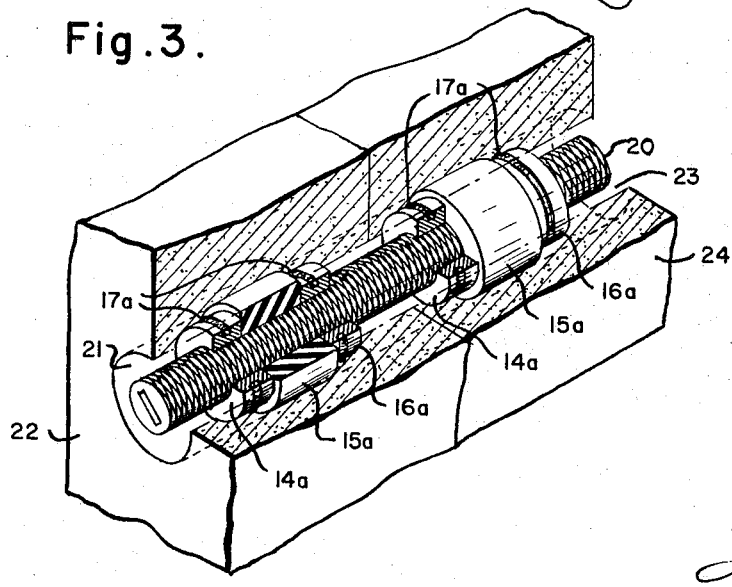
FIGURE 3 is an isometric view partly in section of a second embodiment of my invention.

In the embodiment illustrated in FIGURE 3 I have shown the expansible nut arrangement used in a recessed technique. A threaded member 20 having superimposed right and left hand threads is provided with two sets of paired half nut and sleeve assemblies of the type illustrated in FIGURES 1 and 2 and carrying identical reference numerals with the suffix a added. One assembly made of right hand half nuts 14a, left hand half nuts 16a, bonded to a rubber half sleeve 15a is placed on the threaded member adjacent one end within a hole 21 in one object 22. A second assembly of right hand half nuts 14a, left hand half nuts 16a and half sleeve 15a is placed on the threaded member adjacent the opposite end in hole 23 in object 24. Rotation of threaded member 20 causes half nuts 14a and 16a to move toward one another and thus compress the deformable sleeve 15a so that it expands radially to more tightly engage the interior of holes 21 and 23.

Figure 4:
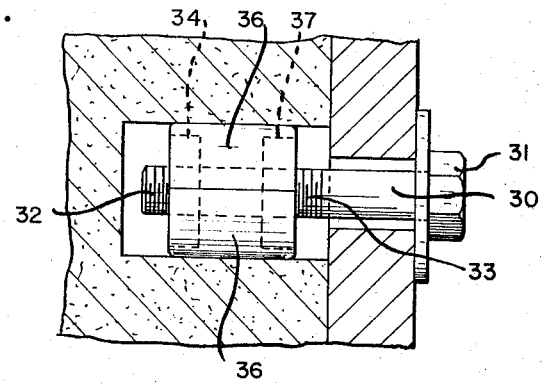
FIGURE 4 is a side elevation of a third embodiment of my invention.
Figure 5:
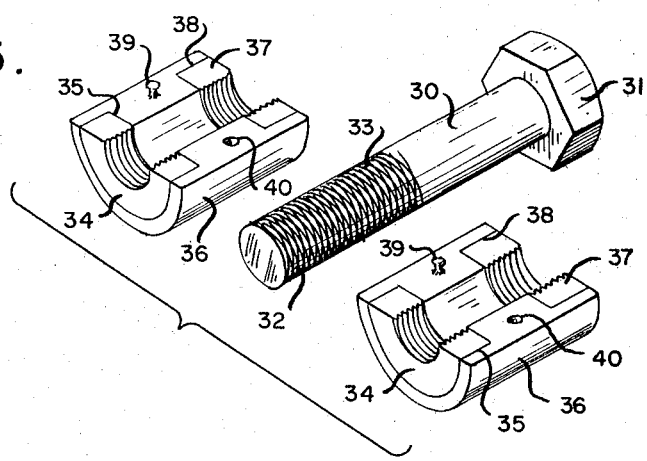
FIGURE 5 is an isometric exploded view of the fastener of FIGURE 4.

In the embodiment illustrated in FIGURES 4 and 5 I have illustrated a bolt 30 having a head 31 at one end and superimposed right hand threads 32 and left hand threads 33 at the opposite end, an expansible nut structure made up of right hand thread half nuts 34 inserted and bonded into a recess 35 at one end of half sleeves of rubber 36 and left hand half nuts 37 inserted and bonded into a recess 38 in the other end of the half sleeves 36. The half sleeve 36 is preferably of rubber or some similar readily deformable material. The half nut assemblies are placed on the threaded portion of bolt 30 and are held together by a snap 39 on one half sleeve and a snap receiving recess 40 on the other half sleeve.

The device of FIGURES 4 and 5 is used in the same manner as the device of FIGURE 1.

Figure 6:
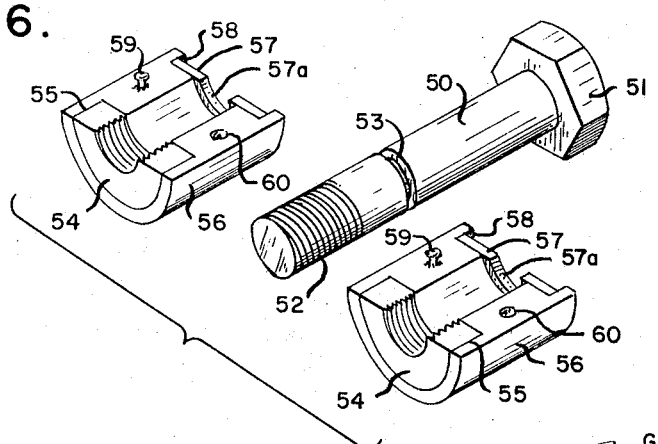
FIGURE 6 is an isometric exploded view of a fourth embodiment of my invention.

In FIGURE 6 I have illustrated an embodiment made up of a bolt 50 having a head 51 at one end and a thread 52 at the opposite end. An annular slot or groove 53 is formed in the bolt intermediate the head 51 and the threads 52. An expansible nut structure made up of threaded half nuts 54 inserted and bonded in a recess 55, half cylinders or sleeves of rubber 56 and half washers 57 inserted and bonded in a recess 58 in the other end of the sleeves 56. The sleeves 56 may be of rubber or any other expansible material as in the case of the preceding figures. The device is used by placing the half nut assemblies over the bolt 50 with the central opening 57a of the half washers 57 fitting within the annular groove 53 of the bolt and the half nut portions 54 engaging the threaded portion 52 of the bolt. The sleeves are fastened together by snap fasteners 59–60 as illustrated and described in FIGURES 4 and 5. The half nut assembly is placed on the bolt as described and is inserted into a prepared opening and the head 51 of the nut 50 rotated to draw the half nuts 54 toward the half washers 57 to deform and expand the intermediate sleeves 56 into engagement with the walls of the hole in which it is inserted.

In the foregoing specification, I have set out certain preferred embodiments of my invention. It will be understood, however, that this invention may be otherwise embodied within the scope of the following claims.

I claim:

1. A blind fastener comprising a member having a shank of substantially constant dimension, said shank having right and left hand threads adjacent one end thereof and an enlarged head at the other end, a pair of deformable half sleeves constructed and arranged to be positioned around said threaded shank intermediate the ends thereof, first engaging means formed in two halves with said halves being permanently fixed to one end of each of said half sleeves, second engaging means formed in two halves with said halves being permanently fixed to the other end of each of said half sleeves, said first and second engaging means halves fitting together and cooperating with said threaded shank when said half sleeves are positioned around said threaded member, said first and second engaging means and said half sleeves being non-rotatable relative to each other said first and second engaging means and said half sleeves being non-rotatable relative to each other, right hand threads disposed on one of said engaging means and left hand threads disposed on the other engaging means to mate with the threads of like hand on said shank, said first engaging means moving axially toward said second engaging means when said threaded member is rotated relative to said half sleeves to thereby distort said half sleeves.

2. The blind fastener of claim 1 wherein said threaded shank has superimposed right and left hand threads thereon and said first engaging means is a pair of right hand threaded half nuts and said second engaging means is a pair of left hand threaded half nuts.

3. A blind fastener as claimed in claim 2 wherein said right and left hand half nut assemblies are spaced apart by a pair of deformable half sleeves, said half nuts being bonded to said sleeves to form an integral assembly and means acting on each of the half nut assemblies to hold them together to form a single effective nut at each end of said sleeves.

4. A blind fastener as claimed in claim 3 wherein the deformable sleeves are of an elastomeric material.

5. A blind fastener as claimed in claim 3 wherein the means acting on the half nut assemblies to hold them together is a spring.

References Cited by the Examiner
UNITED STATES PATENTS

| | | | |
|---|---|---|---|
| 166,113 | 7/1875 | Kent | 151—16 |
| 244,510 | 7/1881 | Abernathy | 151—16 |
| 431,252 | 7/1890 | Clifford | 151—16 |
| 2,521,065 | 4/1946 | Kempton | 85—71 |
| 2,625,071 | 1/1953 | Lewis | 85—67 |
| 2,653,334 | 9/1953 | Bay | 85—71 |
| 3,013,643 | 12/1961 | Perry | 85—70 |
| 3,014,563 | 12/1961 | Bratton | 85—70 |
| 3,021,927 | 2/1962 | McKee | 85—70 |

CARL W. TOMLIN, *Primary Examiner.*

R. S. BRITTS, *Assistant Examiner.*